US012730630B2

(12) United States Patent
Pfeifer et al.

(10) Patent No.: US 12,730,630 B2
(45) Date of Patent: Sep. 8, 2026

(54) REMOTE EVENT CONFIGURATION FOR HIGH-LEVEL PROGRAMING LANGUAGE PLATFORM

(71) Applicant: SAP SE, Walldorf (DE)

(72) Inventors: Tatjana Pfeifer, Altrip (DE); Raphael Dibbern, Oftersheim (DE); Jonas Braun, Heidelberg (DE); Jens Roessler, Wiesloch (DE); Arne Rantzen, Ketsch (DE); Silvana Straus, St. Leon-Rot (DE)

(73) Assignee: SAP SE, Walldorf (DE)

( * ) Notice: Subject to any disclaimer, the term of this patent is extended or adjusted under 35 U.S.C. 154(b) by 745 days.

(21) Appl. No.: 18/062,144

(22) Filed: Dec. 6, 2022

(65) Prior Publication Data

US 2024/0184569 A1 Jun. 6, 2024

(51) Int. Cl.
*G06F 8/71* (2018.01)
*G06F 9/54* (2006.01)

(52) U.S. Cl.
CPC ................ *G06F 8/71* (2013.01); *G06F 9/541* (2013.01); *G06F 9/542* (2013.01); *G06F 2209/547* (2013.01)

(58) Field of Classification Search
CPC . G06F 8/71; G06F 9/541; G06F 9/542; G06F 2209/547; G06F 8/76; G06F 2209/544
See application file for complete search history.

(56) References Cited

U.S. PATENT DOCUMENTS 9,928,103 B1 * 3/2018 Lau .......................... G06F 9/465
10,795,669 B2 * 10/2020 Murala ............... G06F 9/45558
2019/0235850 A1 * 8/2019 Mukherjee ................ G06F 8/71
2019/0243065 A1 * 8/2019 Herbsommer ....... G02B 6/1221
2019/0243665 A1 * 8/2019 Bolik ........................ G06F 8/60

(Continued)

OTHER PUBLICATIONS

Communication: "Extended European Search Report", Apr. 24, 2024 (Apr. 24, 2024), European Patent Office, for European Application No. 23208732.0-1203, 12pages.

(Continued)

*Primary Examiner* — Peng Ke
(74) *Attorney, Agent, or Firm* — Buckley, Maschoff & Talwalkar LLC

(57) ABSTRACT

A configuration data store may contain electronic records representing information defined by an administrator for a plurality of event types and a plurality of cloud-based high-level programing language applications. An enterprise event enablement component of a high-level programing language application platform (e.g., an enterprise or third-party ABAP application) may receive a reconcile request event from an event messaging broker platform. The reconcile request event may include a payload that contains an event type and configuration target state information for the high-level programing language application platform. The enterprise event enablement component may then transmit, to the event messaging broker platform, a reconcile completed event that contains a status of an achieved configuration. The configuration data store is then updated based on the status of the achieved configuration of the high-level programing language application platform.

18 Claims, 13 Drawing Sheets

(56) References Cited

U.S. PATENT DOCUMENTS

| | | | | |
|---|---|---|---|---|
| 2021/0083930 | A1* | 3/2021 | Debbasch | G06F 8/34 |
| 2024/0028411 | A1* | 1/2024 | Xu | G06F 8/71 |

OTHER PUBLICATIONS

Anonymous: "Retransmission (data networks)—Wikipedia", Feb. 11, 2022 (Feb. 11, 2022), XP093145303, Retrieved from the Internet: URL:https://en.wikipedia.org/w/index.php?title=Retransmission_(data_networks)&oldid=1071220516, [retrieved on Mar. 25, 2024], pp. 1-2.

* cited by examiner

Figure 1:
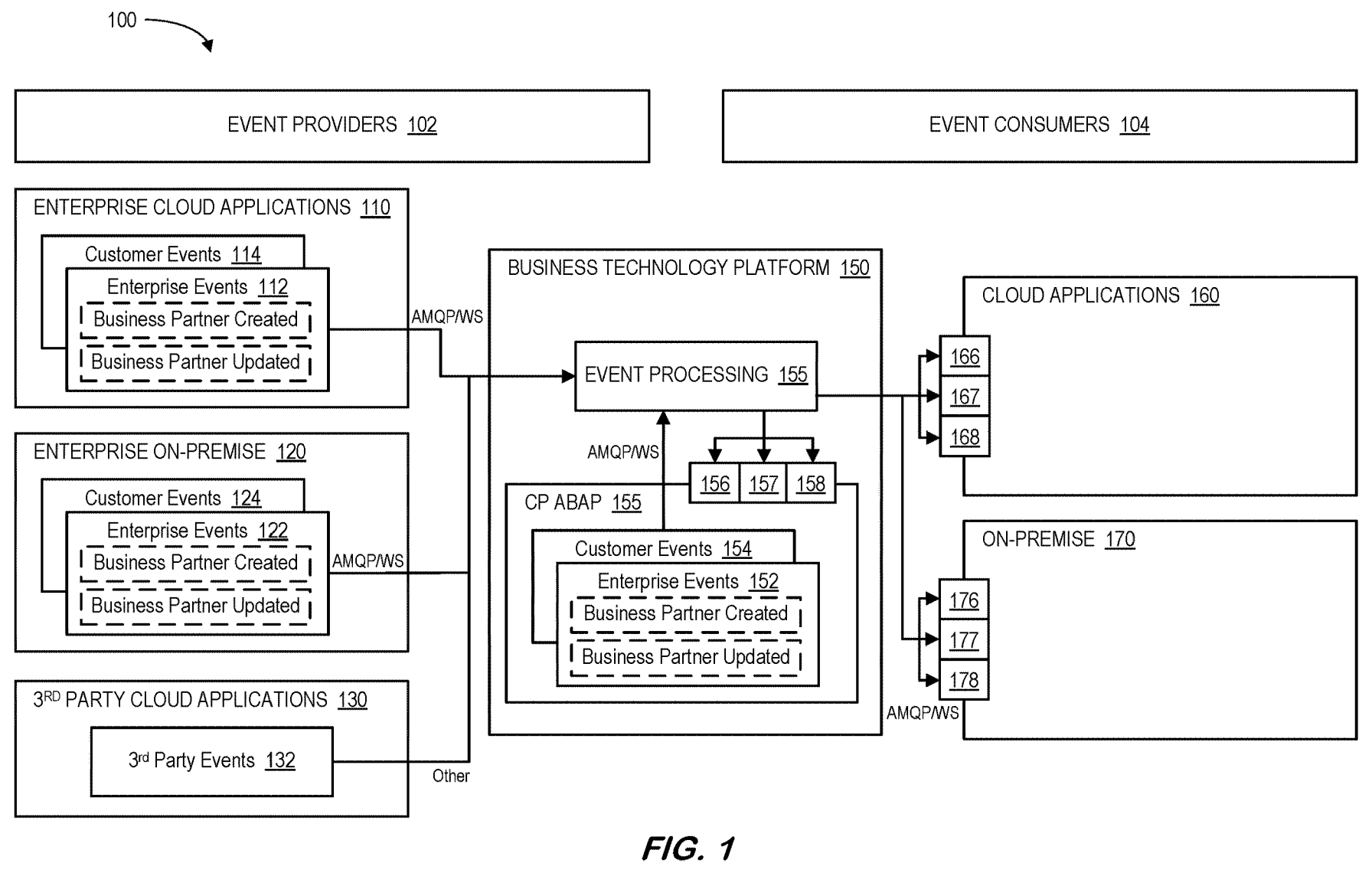

100

EVENT PROVIDERS 102

EVENT CONSUMERS 104

ENTERPRISE CLOUD APPLICATIONS 110

Customer Events 114

Enterprise Events 112

Business Partner Created

Business Partner Updated

AMQP/WS

ENTERPRISE ON-PREMISE 120

Customer Events 124

Enterprise Events 122

Business Partner Created

Business Partner Updated

AMQP/WS

3RD PARTY CLOUD APPLICATIONS 130

3rd Party Events 132

Other

BUSINESS TECHNOLOGY PLATFORM 150

EVENT PROCESSING 155

AMQP/WS 156 157 158

CP ABAP 155

Customer Events 154

Enterprise Events 152

Business Partner Created

Business Partner Updated

AMQP/WS

CLOUD APPLICATIONS 160

166 167 168

ON-PREMISE 170

```
{
      "specversion": "1.0",
      "source": "/eu10/em/data-plane-01",
      "type": "em.Reconcile.Requested.v1",
      "id": "60eafe92-137e-423c-8efe-21863a3647a3",
      "time": "2021-08-05T17:31:00Z",
      "datacontenttype": "application/json",
      "data": {
            "revision": "123456789",
            "produces": {
                  "items": [
                        {
                              "publishingID": "a2975391-1fde-44c3-bea3-aaaaaaaaaaaa",
                              "source": "default/s4.sales/cfcfcfcf-acac-acac-acac-
efefefefefef",
                              "type": "s4.sales.order.created.v1",
                              "consumptionType": "BOTH",
                              "subscriptions": [
                                    "42424242-1fde-4aaa-bea3-016d7b6731fd",
                                    "a2975391-1fde-44c3-bea3-016d7b6731fd"
                              ]
                        }
                  ]
            },
            "consumes": {
                  "items": [
                        {
                              "subscriptionID": "52975391-1fde-44c3-bea3-
016d7b6731fd",
                              "status": "modified",
                              "application": "12345678-1234-4242-4242-172595164221",
                              "source": "/eu10/sf.wa/429322",
                              "type":
"odm.workforce.WorkforceAvailability.Created.v1",
                              "filter": {
                                    "conditions": [
                                          {
                                                "dialect": "basic",
                                                "type": "prefix",
                                                "property": "countrycode",
                                                "value": "de"
                                          }
                                    ]
                              }
                        },
                        {
                              "subscriptionID": "879accc9-8642-4947-9780-
da984d7b435c",
                              "status": "accepted",
                              "application": "12345678-1234-4242-4242-172595164221",
                              "source": "/eu10/sf.wa/429322",
                              "type":
"odm.workforce.WorkforceAvailability.Deleted.v1"
                        }
                  ]
            }
      }
}
```

```
{
      "specversion": "1.0",
      "source": "/eu10/em/data-plane-01",
      "type": "em.Reconcile.Completed.v1",
      "id": "1248f757-22aa-429e-b473-b8e202793ef6",
      "time": "2018-04-05T17:32:00Z",
      "datacontenttype": "application/json",
      "data": {
            "revision": "123456789",
            "produces": [
                  {
                        "publishingID": "a2975391-1fde-44c3-bea3-aaaaaaaaaaaa",
                        "conditions": [
                              {
                                    "status": "false",
                                    "type": "ready",
                                    "reason": "error",
                                    "message": "producer inactive, CRM not
activated"
                              }
                        ]
                  }
            ],
            "consumes": [
                  {
                        "subscriptionID": "52975391-1fde-44c3-bea3-016d7b6731fd",
                        "conditions": [
                              {
                                    "status": "false",
                                    "type": "ready",
                                    "reason": "error",
                                    "message": "consumer inactive, software
component not installed"
                              }
                        ]
                  },
                  {
                        "subscriptionID": "879accc9-8642-4947-9780-da984d7b435c",
                        "conditions": [
                              {
                                    "status": "true",
                                    "type": "ready"
                              }
                        ]
                  }
            ]
      }
}
```

| MESH IDENTIFIER 1202 | EVENT TYPE 1204 | ABAP APPLICATION IDENTIFIERS 1206 | CONFIGURATION STATUS 1208 |
|---|---|---|---|
| M_101 | ET_101; ET_102 | ABAP_101 | RECONCILED |
| MI_101 | ET_103 | ABAP_101; ABAP_103 | PENDING |
| MI_101 | ET_104 | ABAP_104 | SUCCESSFUL |
| MI_102 | ET_101; ET_104 | ABAP_101 | UNSUCCESSFUL |

*FIG. 12*

REMOTE EVENT CONFIGURATION FOR HIGH-LEVEL PROGRAMING LANGUAGE PLATFORM

BACKGROUND

In an event-driven architecture, an application may create events when certain conditions are satisfied. For example, a first enterprise application might generate an event when a manager's address is updated. Moreover, an event consumer might perform particular actions when an event occurs. For example, a second enterprise application responsible for sending reminders to employees and their managers might update a communication table when it detects that a "manager address update" event has occurred. An event-driven architecture is "loosely coupled" in that an event provider does not need to know about what actions will be triggered by any specific event. As a result, new abilities can be easily added to a systems without needing to update event providers.

In some cases, the applications associated with an event driven architecture may utilize a high-level business programming language such as the Advanced Enterprise application Programming ("ABAP") language. Manually creating event providers and consumers for such applications, however, can be a time consuming and error-prone task—especially when a substantial number of events or applications are involved. It would be desirable to configure event processing for a high-level programing language platform in a secure and efficient manner.

SUMMARY

Methods and systems may facilitate event configuration. In particular, in some embodiments a configuration data store may contain electronic records representing information defined by an administrator for a plurality of event types and a plurality of cloud-based high-level programing language applications. An enterprise event enablement component of a high-level programing language application platform (e.g., a high-level programing language application platform representing an enterprise or third-party ABAP application) may receive a reconcile request event from an event messaging broker platform. The reconcile request event may include a payload that contains an event type and configuration target state information for the high-level programing language application platform. The enterprise event enablement component may then transmit, to the event messaging broker platform, a reconcile completed event that contains a status of an achieved configuration. The configuration data store is then updated based on the status of the achieved configuration of the high-level programing language application platform.

Some embodiments comprise: means for storing, in a configuration data store, electronic records representing information defined by an administrator for a plurality of event types and a plurality of cloud-based high-level programing language applications; means for receiving, from an event messaging broker platform by an enterprise event enablement component of a high-level programing language application platform, a reconcile request event including a payload that contains an event type and configuration target state information for the high-level programing language application platform; means for configuring the high-level programming language application platform in accordance with the reconcile request event, including an update to local configuration storage; means for transmitting, from the enterprise event enablement component of the high-level programing language application platform to the event messaging broker platform, a reconcile completed event that contains a status of an achieved configuration; and means for updating the configuration data store based on the status of the achieved configuration of the high-level programing language application platform.

Some technical advantages of some embodiments disclosed herein are improved systems and methods to configure event processing for a high-level programing language platform in a secure and efficient manner.

BRIEF DESCRIPTION OF THE DRAWINGS

FIG. 1 is a high-level system architecture for an event-based integration scenario at runtime.

FIG. 9 is an example of a reconcile requested event in accordance with some embodiments.

FIG. 10 is an example of a reconcile completed event according to some embodiments.

FIG. 12 illustrates a configuration data store in accordance with some embodiments.

DETAILED DESCRIPTION

Figure 2:
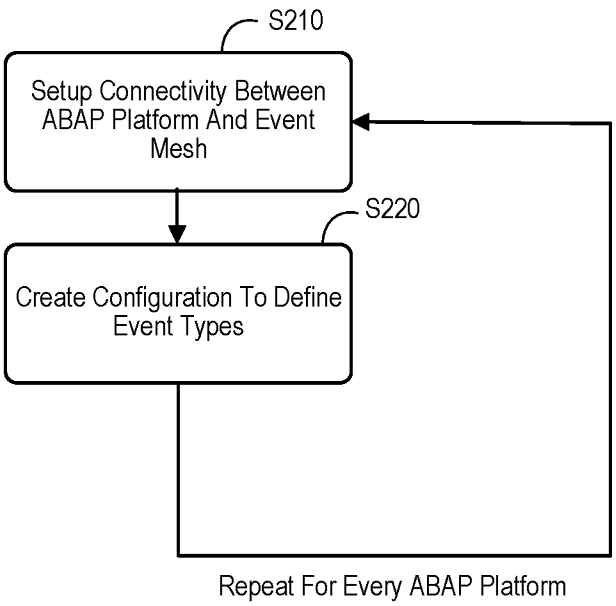
FIG. 2 is a typical event configuration method.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

FIG. 1 is a high-level system 100 architecture for an event-based integration scenario at runtime. Embodiments are not limited to the FIG. 1 architecture. The system 100 supports event providers 102 and event consumers 104. In particular, enterprise cloud applications 110, on-premise application 120, and third-party cloud applications 130 may comprise event providers 102. For example, the enterprise cloud applications 110 might be associated with a business programs running on an SAP® S/4HANA™ Enterprise Resource Platform ("ERP") cloud environment for large enterprises. These applications may generate enterprise events 112 (e.g., business partner created or business partner updated) and/or customer events 114. In some cases, the events may be transmitted using the Advanced Message Queuing Protocol over WebSocket ("AMQP/WS") protocol. Similarly, the enterprise on-premise application 120 might generate enterprise events 122 and/or customer events 124, and the third-party cloud applications 130 may generate third-party events 132.

The events may be received by event processing 155 at a business technology platform 150. The business technology platform 150 may include a high-level programming language platform, such as Cloud Platform ("CP") ABAP 155 that generates enterprise events 152 and/or customer events 154. The business technology platform 150 may include interfaces to support customer events 156, third-party events 157, and enterprise events 158. Moreover, the event consumers 104 may be associated with cloud applications 160 (supporting customer, third-party, and enterprise interfaces 166, 167, 168) and on-premise applications 170 (supporting customer, third-party, and enterprise interfaces 176, 177, 178). The event consumers 104 may then automatically respond to events created by the event providers 102 as appropriate. As used herein, the term "automatically" may refer to a device or process that can operate with little or no human interaction.

According to some embodiments, devices, including those associated with the system 100 and any other device described herein, may exchange data via any communication network, which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores, which may be locally stored or reside remote from various elements. Although a single business technology platform 150 is shown in FIG. 1, any number of such devices may be included. Moreover, various devices described herein might be combined according to embodiments of the present invention. Some or all of the system 100 functions may be performed by a constellation of networked apparatuses, such as in a distributed processing or cloud-based architecture.

An operator or administrator may access the system 100 via a remote device (e.g., a Personal Computer ("PC"), tablet, or smartphone) to view data about and/or manage operational data in accordance with any of the embodiments described herein. In some cases, an interactive graphical user interface display may let the operator or administrator define and/or adjust certain parameters (e.g., to set up or adjust various mapping relationships) and/or provide or receive automatically generated recommendations, results, and/or alerts from the system 100.

In this way, event-driven patterns can be used to integrate arbitrary applications with each other. Applications which cannot/should not connect directly with each other benefit most from the event-driven integration. For use-cases such as the Intelligent Enterprise Suite ("IES"), an SAP® Event Mesh ("EM") kernel service may facilitate the event exchange between SAP® and non-SAP® applications. Systems that exchange events with each other are usually configured to publish and/or to subscribe to events as appropriate. For example, FIG. 2 is a typical event configuration method for ABAP-based products.

At S210, an administrator may setup the connectivity between the ABAP-platform and the SAP® EM service. Subsequently, at S220 a configuration is created which defines that event types need to be published from the ABAP-platform (and to which event types the ABAP-based product should subscribe). Because an enterprise may offer a heterogeneous set of products, the configuration can look very different in each product. As a result, there is a burden for customers who setup End-to-End ("E2E") integrations. For example, the customer may need to reconcile how these ABAP-platform specific configurations interact with the SAP® EM and other systems and products, and this can quickly become a tedious and complex task.

Figure 3:
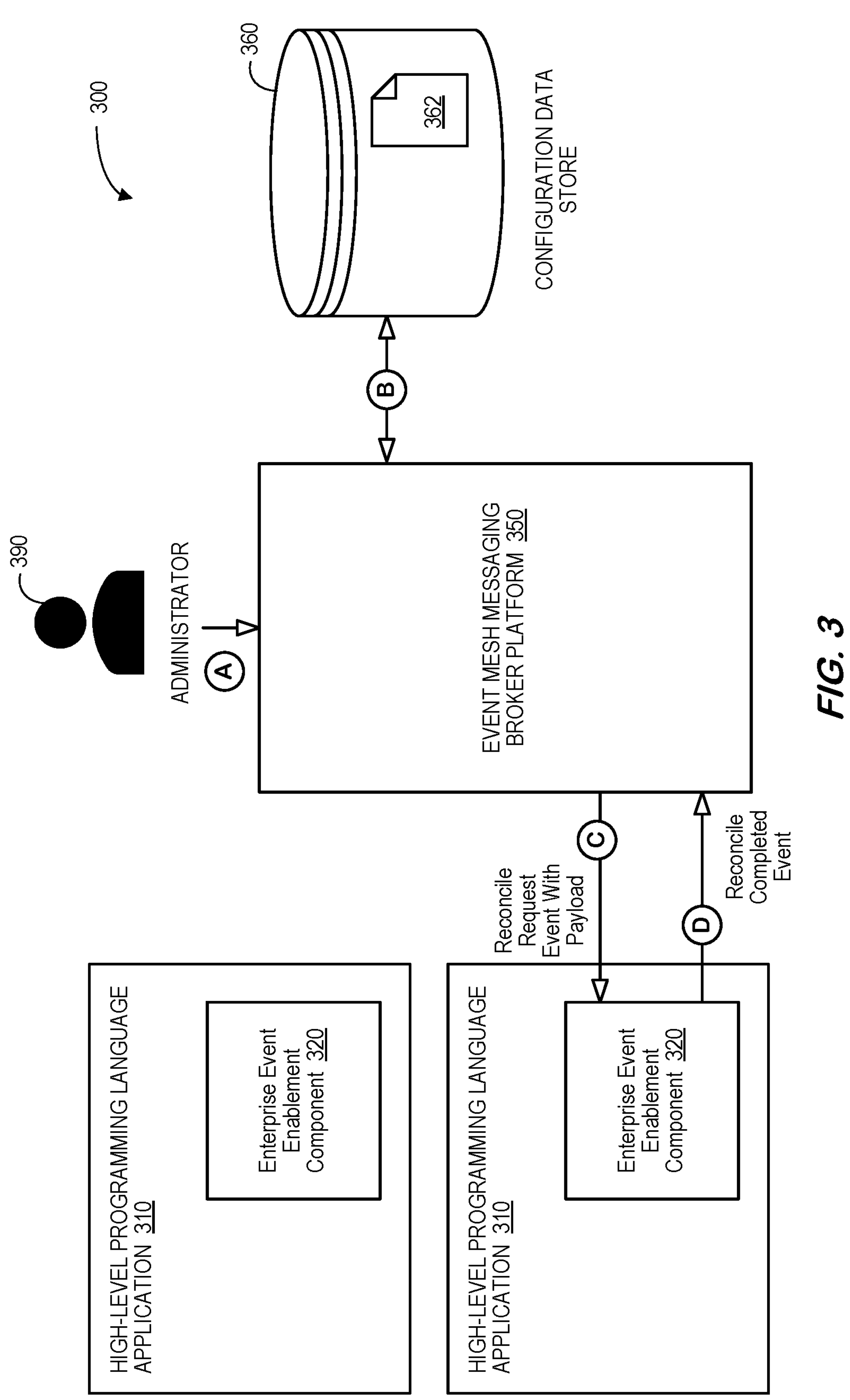
FIG. 3 is a high-level system architecture for event configuration in accordance with some embodiments.

To avoid such a result, FIG. 3 is a high-level system 300 architecture for event configuration in accordance with some embodiments. The system may support, for example, high-level programming language applications 310 (e.g., cloud-based ABAP applications). Each high-level programming language application 310 may execute on a "platform" which, as used herein, may refer to any device or apparatus (or group of devices) able to execute the actions described herein (e.g., receiving a reconcile request event, performing a configuration, transmitting a reconcile completed event, etc.). At (A), an administrator 390 may interact with an event mesh messaging broker platform 350 to provide configuration information (which may be stored in a configuration data store 360 configuration table 362 at (B)). In accordance with the configuration table 362, the event mesh messaging broker platform 350 transmits a reconcile request (with a payload) to a high-level programming language application 310 Enterprise Event Enablement ("EEE") component 320 at (C). The EEE component 320 responds with a reconcile completed event at (D). By way of example, the EEE component 320 may be associated with an algorithm or framework that helps ensure that events can be used to trigger a substantially real-time notification event to be sent out to an event mesh. Moreover, some embodiments may use an open, modular architecture such that the events can be enriched with additional custom information to support various use-cases (and provide application management, security, logging, etc.).

Figure 4:
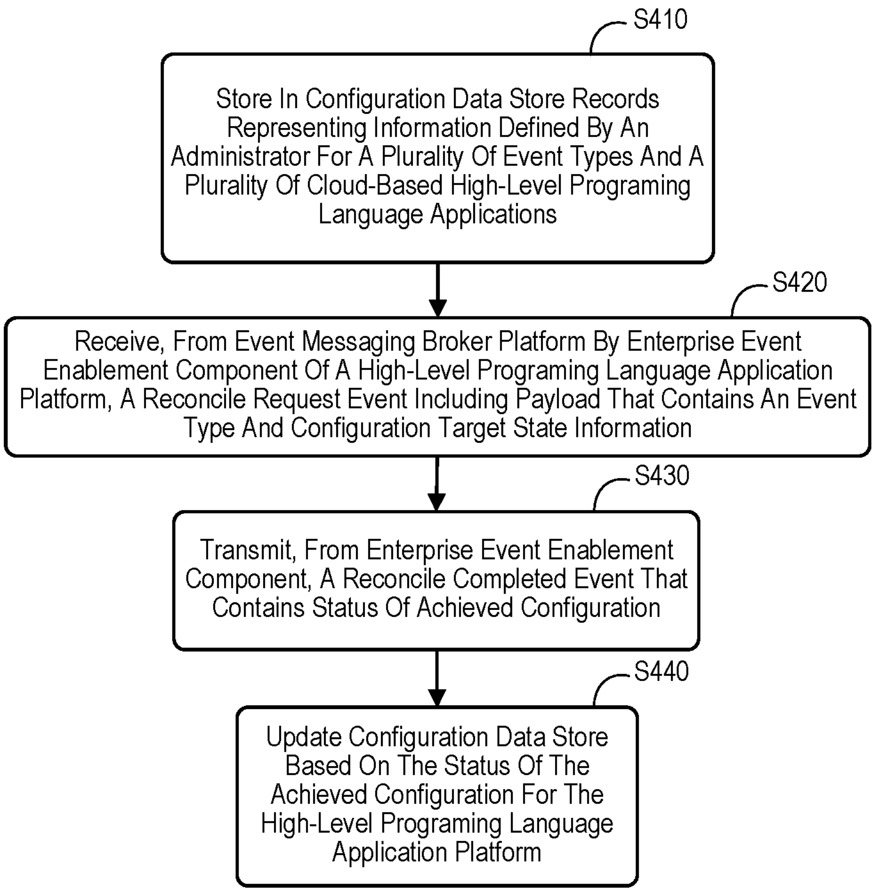
FIG. 4 is an example of an event configuration method according to some embodiments.

FIG. 4 is an example of an event configuration method that might be performed by some, or all, of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, the system may store, in a configuration data store, electronic records that represent information defined by an administrator for a plurality of event types and a plurality of cloud-based high-level programing language (e.g., ABAP) applications. At S420, an enterprise event enablement component of a high-level programing language application platform may receive a reconcile request event from an event messaging broker platform. The high-level programing language application platform might be associated with, for example, an enterprise application or a third-party application. According to some embodiments, the reconcile request event may include a payload that contains an event type and configuration target state information for the high-level programing language application platform. Moreover, the system may then configure the high-level programming language application platform in accordance with the reconcile request event (including an update to local configuration storage). At S430, the enterprise event enablement component may transmit, to the event mesh messaging broker platform, a reconcile completed event that contains a status of an achieved configuration. At S440, the configuration data store may be updated based on the status of the achieved configuration of the high-level programing language application platform. According to some embodiments, the reconcile request event and/or the reconcile completed event may comprise a JavaScript Object Notation ("JSON") file.

According to some embodiments, if the event messaging broker platform does not receive a reconcile completed event (e.g., within a predetermined time period), it retransmits the reconcile request event to the enterprise event enablement component of the high-level programing language application platform. Moreover, if the status of the achieved configuration indicates that reconciliation was unsuccessful, the event messaging broker platform might automatically perform at least one remediation action (e.g., installing needed components, re-boot a server crash, etc.). If, on the other hand, the status of the achieved configuration indicates that reconciliation was successful, the event messaging broker platform may facilitate publishing and consuming the event type for the high-level programing language application platform.

Some embodiments may use configuration events of type "em.Reconcile.Requested.v1." The event payload may reflect the complete target state of the configuration which shall be applied to the configuration tables of the EE framework of the ABAP-platform. Inside a configuration event, the event mesh describes the event types a connected ABAP-platform based system shall publish and the event types it shall consume from the event mesh depending on filter criteria defined upon, for example, cloud-event context attributes. Filter criteria can also be defined for payload fields of event types.

The EEE may provide an event consumer that is capable of processing and understanding events "em.Reconcile.Requested.v1" received from the event mesh. The event consumer processes the requested revision, and configures it for the same connection that received the configuration event. In general, the system may proceed as tolerantly as possible (it may be the case that the requested event producer or event consumer does not exist in the cloud system).

Figure 5:
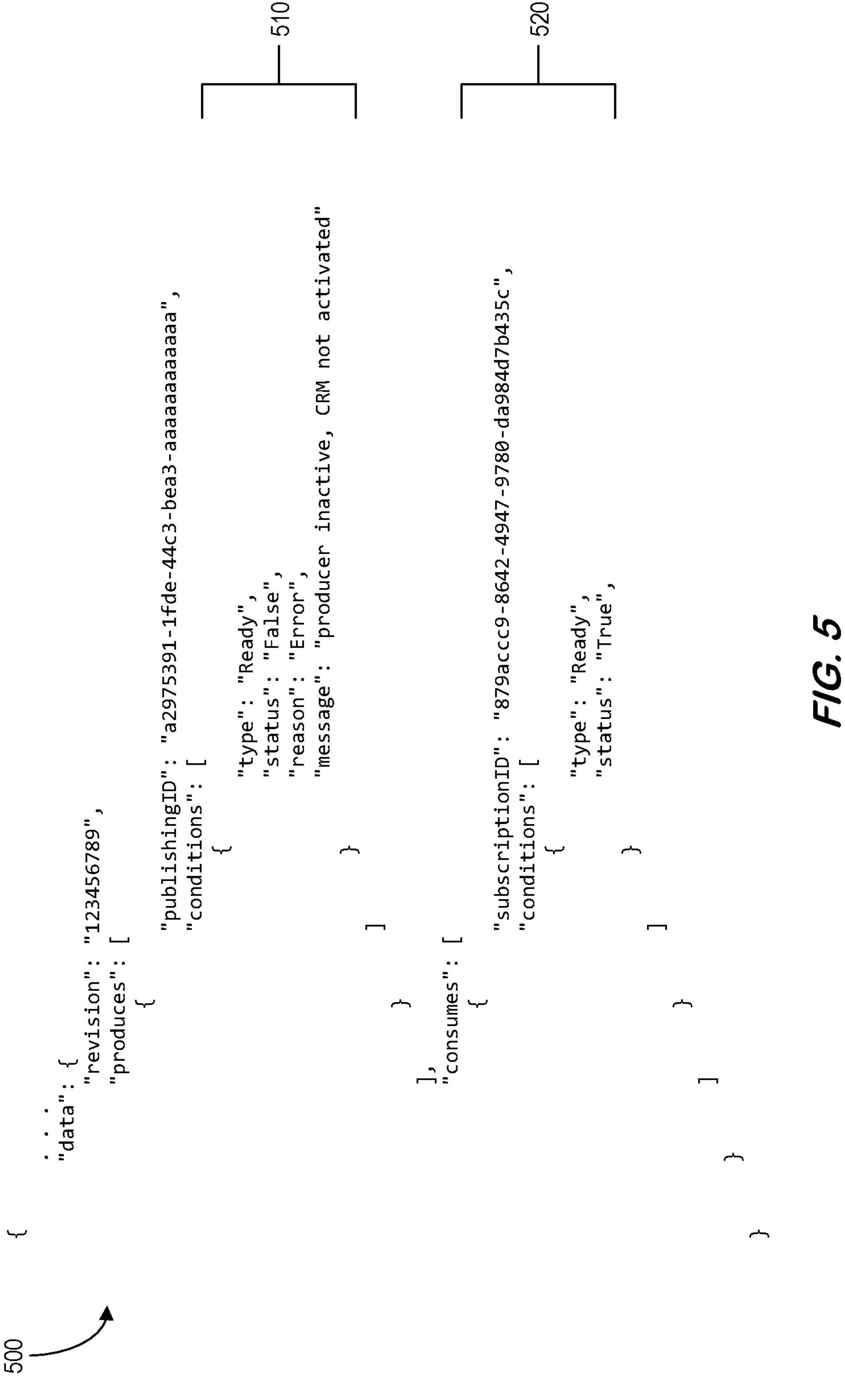
FIG. 5 is a status representation of a completed configuration event in accordance with some embodiments.

After processing a configuration event request, a corresponding confirmation event "em.Reconcile.Completed.v1" is expected by the event mesh (a "reconciliation mechanism"). The EEE provides a corresponding event producer to publish such an event of type em.Reconcile.Completed.v1. As result of this reconciliation process, the EEE publishes the em. Reconcile.Completed.v1 event that contains the status of the achieved configuration. According to some embodiments, the status of the configuration is reported in the em.Reconcile.Completed.v1 event individually for each event type requested to be configured (either for consumption or publishing). FIG. 5 is a status representation of a completed configuration event 500 including produces information 510 and consumes information 520 in accordance with some embodiments.

Figure 6:
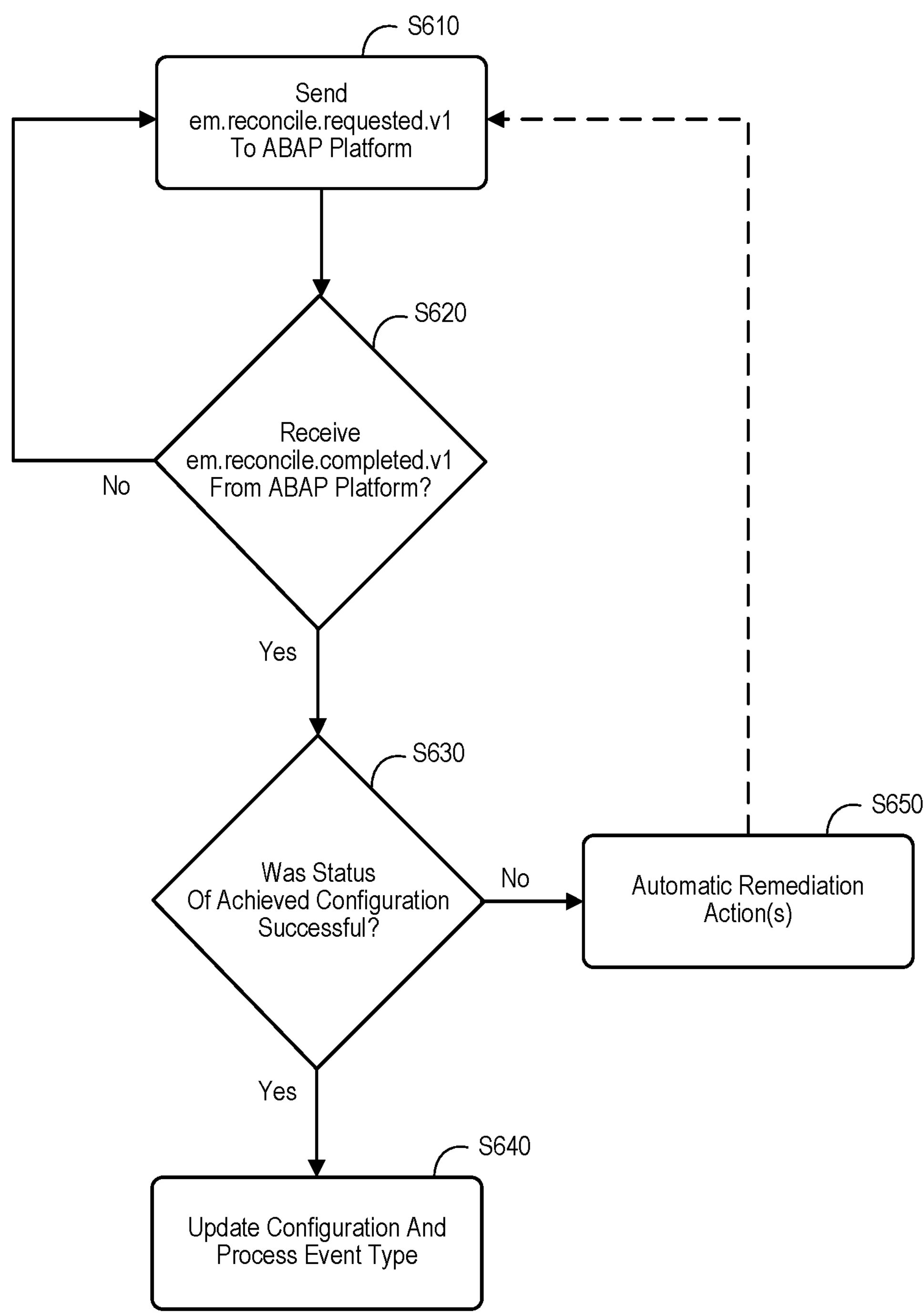
FIG. 6 is a configuration method according to some embodiments.

FIG. 6 is a configuration method according to some embodiments. At S610, the event mesh may send em.reconcile.requested.v1 to an ABAP platform (e.g., the EEE of the ABAP platform). If the EEE does not send an em.Reconcile.Completed.v1 event at S620 (e.g., within a predetermined time period), the event mesh will send the same revision request again. Only after the required revision has been processed will the EEE send a completed em.Reconcile.Completed.v1. That is, these two requests are similar to the request and response used within HTTP 1.1.

Note that the publishing of the em. Reconcile.Completed.v1 event does not imply that the complete requested revision was successfully applied. Each requested item for consume and produce may be individually processed. The corresponding status of each item is represented in the JSON of the completed event. When the status of the achieved configuration is successful at S630, the system may update the configuration and process the event type at S640. If the status of the achieved configuration is not successful at S630, the system may apply one or more automatic remediation actions at 650 and resend the request at S610 (illustrated by the dashed line in FIG. 6).

Figure 7:
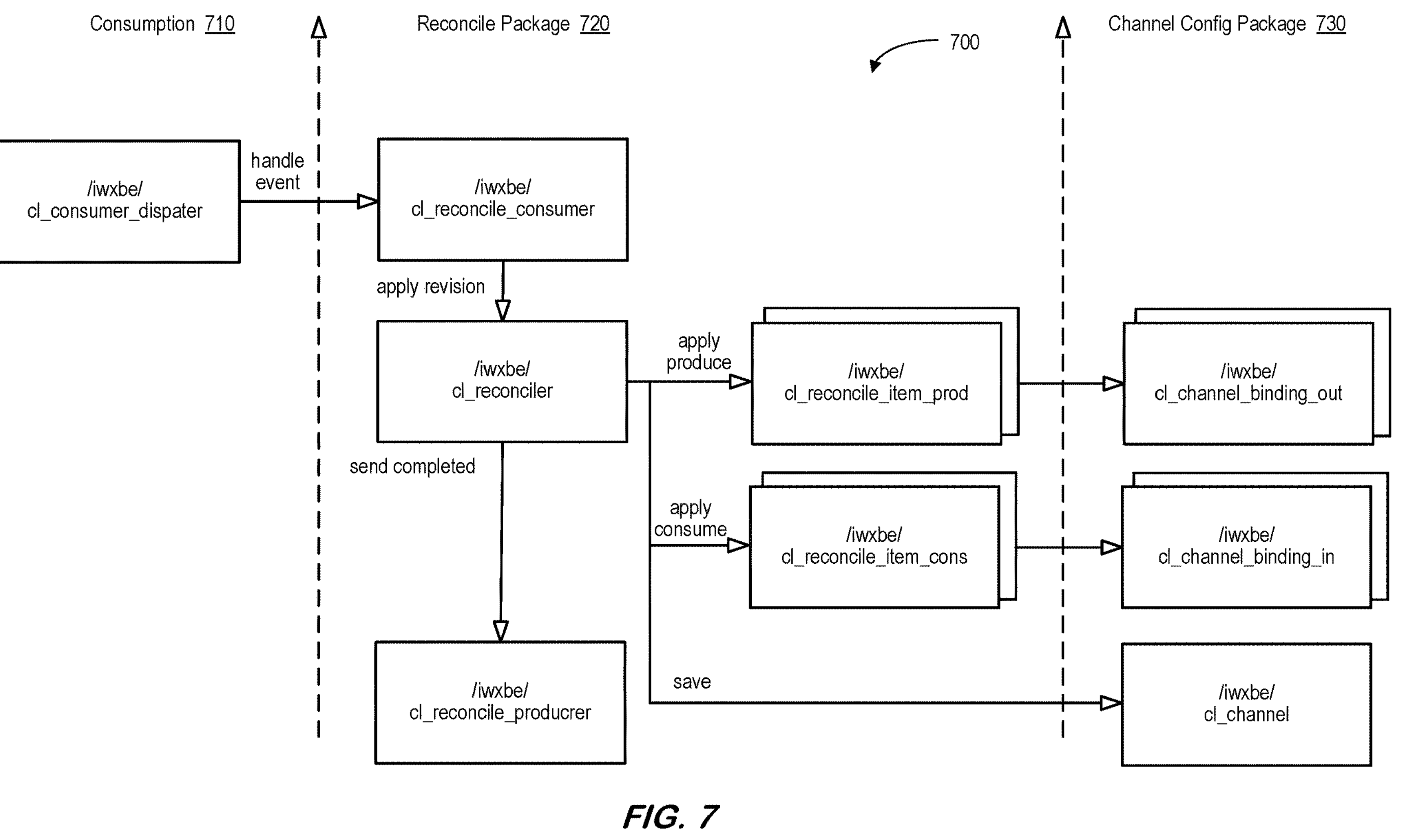
FIG. 7 is a reconciliation implementation in accordance with some embodiments.

FIG. 7 is a reconciliation implementation 700 including consumption 710, reconcile package 720, and channel configuration package 730 in accordance with some embodiments. When implementing the reconciliation between the event mesh and S/4HANA, as few parallel solutions as possible might be implemented. As a result, the EEE may rely on given concepts and solutions providing various advantages, such as maintainability, testability, the use of existing UIs, and other aspects. Therefore, both the event consumer and the event producer are registered in the default repository of the EEE framework. This results in a normal processing of the cloud/config events through the EEE stack. The actual reconciliation may be done in/iwxbe/cl_reconciler. As a result, the requested revision is applied by this reconciler class.

The event consumer/IWXBE/RECONCILIATION may be registered in the EEE default repository. This event consumer refers to the following two classes. The first, "/iwxbe/cl_reconcile_descr_cons" describes the cloud event type em.Reconcile.Requested.v1 and also describes the payload type used for a given cloud type (using the structure /iwxbe/if_reconcile_types=>ty_s_reconcile_requested). The second is "/iwxbe/cl_reconcile_consumer" which is responsible for retrieving business data and calling the actual/iwxbe/cl_reconciler.

The reconciler may be responsible for actually applying the revision that is requested by the data plane. This revision may, according to some embodiments, be requested by the cloud event em. Reconcile.Requested.v1 and is handled by the event consumer /IWXBE/RECONCILIATION. After the business data is deserialized, the event consumer calls/iwxbe/cl_reconciler=> apply_revision( ). This method and processing will now be described in more detail.

Figure 8:
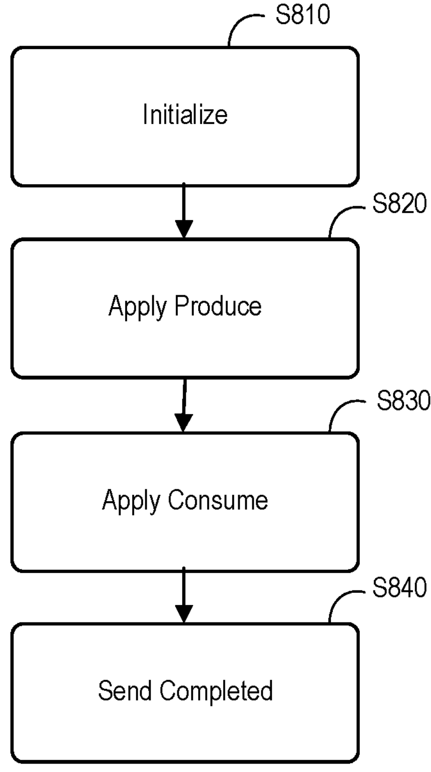
FIG. 8 is a reconciler method according to some embodiments.

FIG. 8 is a reconciler method according to some embodiments. At S810, the reconciler may initialize. That is, the already persisted inbound and outbound bindings for the /iwxbe/beb channel may be gathered and stored in member variables mt_produce_item and mt_consume_item and the no longer requested produce/consume items may be deleted.

According to some embodiments, the deletion of all maintained bindings for the/iwxbe/beb channel is not foreseen (because the reconcile request may be triggered multiple times). Furthermore, a separate processing of the individual requested items may be implemented.

At S820, the reconciler may apply produce by applying the reconciliation for the requested produce items/iwxbe/if_reconcile_item~apply. If the outbound binding already exists, it will be checked to see if a change is needed. If the outbound binding does not exist, a new binding may be created. Moreover, the binding may be removed from /iwxbe/if_reconcile_item~removed after the item is no longer requested. At S830, the reconciler may apply consume by applying the reconciliation for the requested consume items/iwxbe/if_reconcile_item~apply. If the inbound binding already exists, it will be checked to see if a change is needed. If the inbound binding does not exist, a new binding may be created. Moreover, the binding may be removed from /iwxbe/if_reconcile_item~removed after the item is no longer requested.

At S840, the reconciler may send completed. In particular, the system may create an event producer instance and send the result of the applied revision via an em.Reconcile.Completed.v1 event. Here, the/iwxbe/cl_reconciler→get_applied_revision( ) may be used to set the business data to send the em. Reconcile.Completed.v1 via the reconciliation producer.

Each requested item (represented in the produces or consumes object of the em.Reconcile.Requested.v1 cloud event) may be represented via an instance of the interface /iwxbe/if_reconcile_item. The requested item/instance may be, in some embodiments, clearly recognizable by an identifier. This identifier mighty also be re-used for the internal processing, meaning that the persisted inbound and outbound bindings may be recognizable by the provided identifier. As a result, an explicit relation between requested item and binding may be achieved.

The interface/iwxbe/if_reconcile_item may try to combine the needed methods for both scenarios. It might be implemented by/iwxbe/cl_reconcile_item_prod and /iwxbe/cl_reconcile_item_cons. The following three methods might be offered in accordance with some embodiments. First, an "apply" method may determine the necessary information to create either the outbound or the inbound binding (depending on class implementation). If the binding already exists and a change is requested, it may be deleted (and a new binding may be created). Second, an "is_reconcile_requested" method may return true once the item is still requested by the reconciliation. Third, a "remove" method may be provided such that once the item is no longer requested by the reconciliation, the referenced binding will be deleted from the channel/iwxbe/bebZvent Producer.

The event producer/IWXBE/RECONCILIATION may be registered in the EEE default repository. This event producer may reference the following descriptor class /iwxbe/cl_reconcile_descr_prod that describes the cloud event type em.Reconcile.Completed.v1. Moreover, the descriptor class/iwxbe/cl_reconcile_descr_prod may describe the payload type used for given cloud type (e.g., the structure used might be /iwxbe/if_reconcile_types=>ty_s_reconcile_completed). Note that the application namespace may be normally derived from the repository and the ABAP object. Some embodiments may overwrite the application namespace.

Some examples of reconcile events will now be provided. FIG. 9 is one example of a JSON reconcile requested event 900 in accordance with some embodiments (including information such as produces information and consumes information) that might comprise em.Reconcile.Requested.v1. FIG. 10 is an example of a reconcile completed event 1000 according to some embodiments (including information such as produces information and consumes information) that might comprise em.Reconcile.Completed.v1.

Figure 11:
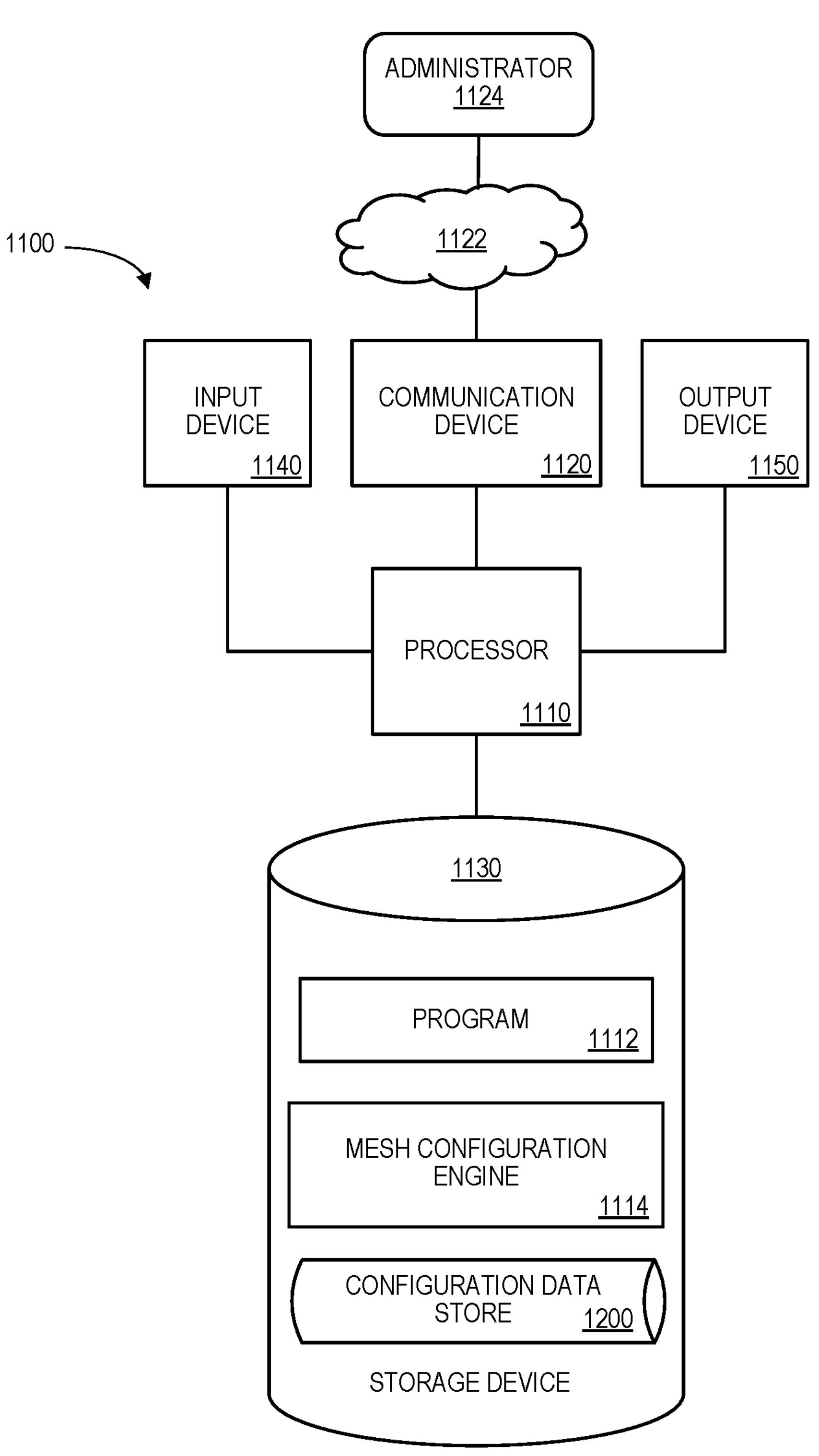
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the system 300 of FIG. 3 (and/or any other system described herein). The platform 1100 comprises a processor 1110, such as one or more commercially available CPUs in the form of one-chip microprocessors, coupled to a communication device 1120 configured to communicate via a communication network (not shown in FIG. 11). The communication device 1120 may be used to communicate, for example, with one or more remote user platforms or an administrator device 1124 via a communication network 1122. The platform 1100 further includes an input device 1140 (e.g., a computer mouse and/or keyboard to input data about an event mesh or data sources) and an output device 1150 (e.g., a computer monitor to render a display, transmit views and/or create monitoring reports). According to some embodiments, a mobile device and/or PC may be used to exchange data with the platform 1100.

The processor 1110 also communicates with a storage device 1130. The storage device 1130 can be implemented as a single database, or the different components of the storage device 1130 can be distributed using multiple databases (that is, different deployment data storage options are possible). The storage device 1130 may comprise any appropriate data storage device, including combinations of magnetic storage devices (e.g., a hard disk drive), optical storage devices, mobile telephones, and/or semiconductor memory devices. The storage device 1130 stores a program 1112 and/or a mesh configuration engine 1114 for controlling the processor 1110. The processor 1110 performs instructions of the programs 1112, 1114, and thereby operates in accordance with any of the embodiments described herein. For example, the processor 1110 may receive a reconcile request event from an event messaging broker platform. The reconcile request event may include a payload that contains an event type and configuration target state information for a high-level programing language application platform. The processor 1110 may then transmit a reconcile completed event that contains a status of an achieved configuration. The configuration data may then be updated based on the status of the achieved configuration of the high-level programing language application platform.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, data may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further includes a configuration data store 1200. Moreover, in some embodiments the program 1112 may access the configuration data store 1200 to configure ABAP application events. An example of a database that may be used in connection with the platform 1100 will now be described in detail with respect to FIG. 12. Note that the database described herein is only one example, and additional and/or different data may be stored therein. Moreover, various databases might be split or combined in accordance with any of the embodiments described herein.

Referring to FIG. 12, a table is shown that represents the configuration data store 1200 that may be associated with the platform 1100 according to some embodiments. The table may include, for example, entries identifying events in connection with a cloud or on-premise computing environment. The table may also define fields 1202, 1204, 1206, 1208 for each of the entries. The fields 1202, 1204, 1206, 1208 may, according to some embodiments, specify a mesh identifier 1202, an event type 1204, one or more ABAP application identifiers 1206, and a configuration status 1208. The configuration data store 1200 may be created and updated, for example, when a new ABAP application is supported, a new event type is added or deleted, etc.

The mesh identifier 1202 might be a unique alphanumeric label or link that is associated with a cloud computing environment (e.g., an SAP® business technology platform). The event type 1204 indicates a type of event that is supported by the mesh identifier 1202 or data plane. The ABAP application identifiers 1206 indicates which high-level programming language applications need to support the event type 1204. The configuration status 1208 might indicate, for example, that a reconcile request has been reconciled (e.g., a reconcile complete has been received), is pending (e.g., the request has been send but no complete has yet been received), was successful (e.g., the ABAP applications can now use the event), was unsuccessful (e.g., and a remediation action is to be performed), etc.

Figure 13:
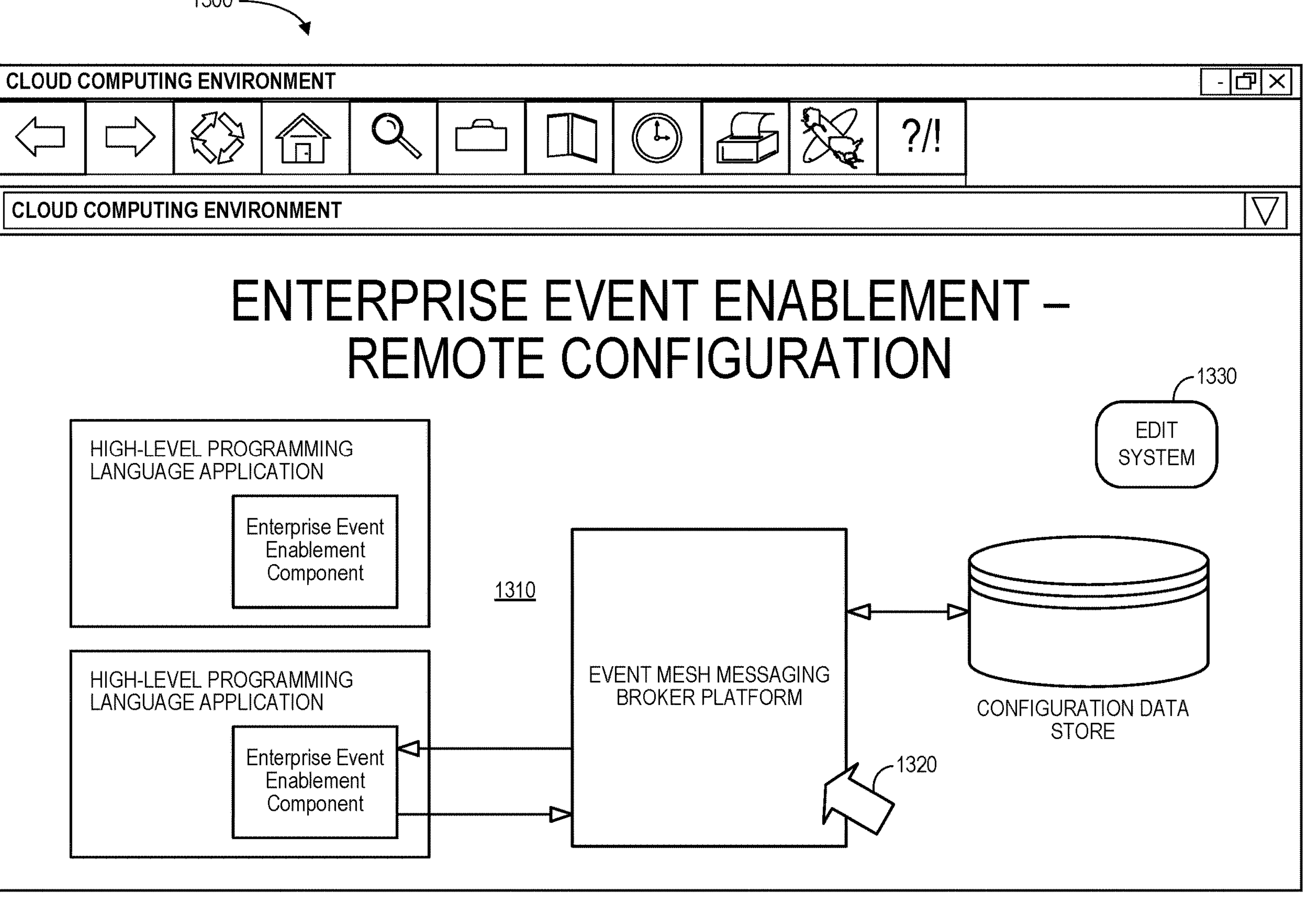
FIG. 13 is a human machine interface display in accordance with some embodiments.

FIG. 13 is a human-machine interface display 1300 in accordance with some embodiments. The display 1300 includes a graphical representation 1310 or dashboard that might be used to manage or monitor event configuration (e.g., associated with a cloud provider). In particular, selection of an element (e.g., via a touchscreen or computer mouse pointer 1320) might result in the display of a popup window that contains configuration data. The display 1300 may also include a user selectable "Edit System" icon 1330 that an administrator may use to request system changes (e.g., to investigate or improve reconciliation problems).

Thus, embodiments may remotely configure event types that an ABAP-platform based system will publish and the event types it will consume from the event mesh. This may avoid the prior manual and decentralized process for customers. A remote, accessible configuration API enables an automated setup of business processes centrally from an event mesh kernel service. Furthermore, cloud events may be configured independent of the specific protocol that is used.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of events and ABAP application, any of the embodiments described herein could be applied to other types of events or applications. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate event configuration, comprising:

a configuration data store that contains electronic records representing configuration information defined by an administrator for a plurality of event types and a plurality of cloud-based high-level programing language applications; and a high-level programming application platform, including:

a computer processor, and a memory storage device, coupled to the computer processor, including instructions that, when executed by the computer processor, enable the high-level programming language platform to:

(i) receive, from an event messaging broker platform by an enterprise event enablement component of a high-level programing language application executing on the high-level programing language application platform, a reconcile request event including a payload that contains an event type and configuration target state information for the high-level programing language application platform, (ii) process the reconcile request event to configure the high-level programming language application platform in accordance with the reconcile request event;

(iii) transmit, from the enterprise event enablement component of the high-level programing language application to the event messaging broker platform in response to the processing of the reconcile request event, a reconcile completed event that contains a status of an achieved configuration of the high-level programming language application platform; and (iv) in an instance the event messaging broker platform does not receive a reconcile completed event, the event messaging broker platform retransmits the reconcile request event to the enterprise event enablement component of the high-level programing language application; and update the configuration data store based on the status of the achieved configuration of the high-level programing language application platform.

2. The system of claim 1, wherein the high-level programming language platform is associated with an Advanced Enterprise application Programming ("ABAP") language.

3. The system of claim 1, wherein if the status of the achieved configuration indicates that reconciliation was unsuccessful, the event messaging broker platform automatically performs at least one remediation action.

4. The system of claim 1, wherein if the status of the achieved configuration indicates that reconciliation was successful, the event messaging broker platform facilitates publishing and consuming the event type for the high-level programing language application platform.

5. The system of claim 1, wherein the high-level programing language application platform is associated with one of an enterprise application and a third-party application.

6. The system of claim 1, wherein at least one of the reconcile request event and the reconcile completed event comprises a JavaScript Object Notation ("JSON") file.

7. A computer-implemented method to facilitate event configuration, comprising:

storing, in configuration data store, electronic records representing configuration information defined by an administrator for a plurality of event types and a plurality of cloud-based high-level programing language applications;

receiving, from an event messaging broker platform by an enterprise event enablement component of a high-level programing language application executing on the high-level programing language application platform, a reconcile request event including a payload that contains an event type and configuration target state information for the high-level programing language application platform;

processing the reconcile request event to configure the high-level programming language application platform in accordance with the reconcile request event;

transmitting, from the enterprise event enablement component of the high-level programing language application platform to the event messaging broker platform in response to the processing of the reconcile request event, a reconcile completed event that contains a status of an achieved configuration of the high-level programming language application platform;

re-transmitting by the event messaging broker platform, in an instance the event messaging broker platform does not receive a reconcile completed event, the reconcile request event to the enterprise event enablement component of the high-level programing language application; and updating the configuration data store based on the status of the achieved configuration of the high-level programing language application platform.

8. The method of claim 7, wherein the high-level programming language platform is associated with an Advanced Enterprise application Programming ("ABAP") language.

9. The method of claim 7, wherein if the status of the achieved configuration indicates that reconciliation was unsuccessful, the event messaging broker platform automatically performs at least one remediation action.

10. The method of claim 7, wherein if the status of the achieved configuration indicates that reconciliation was successful, the event messaging broker platform facilitates publishing and consuming the event type for the high-level programing language application platform.

11. The method of claim 7, wherein the high-level programing language application platform is associated with one of an enterprise application and a third-party application.

12. The method of claim 7, wherein at least one of the reconcile request event and the reconcile completed event comprises a JavaScript Object Notation ("JSON") file.

13. A non-transitory, computer readable medium having executable instructions stored therein to perform a method to facilitate event configuration, the method comprising:

storing, in a configuration data store, electronic records representing configuration information defined by an administrator for a plurality of event types and a plurality of cloud-based high-level programing language applications;

receiving, from an event messaging broker platform by an enterprise event enablement component of a high-level programing language application executing on the high-level programing language application platform, a reconcile request event including a payload that contains an event type and configuration target state information for the high-level programing language application platform;

processing the reconcile request event to configure the high-level programming language application platform in accordance with the reconcile request event;

transmitting, from the enterprise event enablement component of the high-level programing language application to the event messaging broker platform in response to the processing of the reconcile request event, a reconcile completed event that contains a status of an achieved configuration of the high-level programming language application platform;

re-transmitting by the event messaging broker platform, in an instance the event messaging broker platform does not receive a reconcile completed event, the reconcile request event to the enterprise event enablement component of the high-level programing language application; and updating the configuration data store based on the status of the achieved configuration of the high-level programing language application platform.

14. The medium of claim 13, wherein the high-level programming language platform is associated with an Advanced Enterprise application Programming ("ABAP") language.

15. The medium of claim 13, wherein if the status of the achieved configuration indicates that reconciliation was unsuccessful, the event messaging broker platform automatically performs at least one remediation action.

16. The medium of claim 13, wherein if the status of the achieved configuration indicates that reconciliation was successful, the event messaging broker platform facilitates publishing and consuming the event type for the high-level programing language application platform.

17. The medium of claim 13, wherein the high-level programing language application platform is associated with one of an enterprise application and a third-party application.

18. The medium of claim 13, wherein at least one of the reconcile request event and the reconcile completed event comprises a JavaScript Object Notation ("JSON") file.

* * * * *